(12) United States Patent
Hidayetoglu

(10) Patent No.: US 7,033,663 B1
(45) Date of Patent: Apr. 25, 2006

(54) FUNCTIONALLY GRADED FRICTION MATERIAL

(75) Inventor: Tulin Kuzulugil Hidayetoglu, West Bloomfield, MI (US)

(73) Assignee: Eaton Corporation, Cleveland, OH (US)

(*) Notice: Subject to any disclaimer, the term of this patent is extended or adjusted under 35 U.S.C. 154(b) by 720 days.

(21) Appl. No.: 09/604,218

(22) Filed: Jun. 27, 2000

(51) Int. Cl.
*B32B 7/00* (2006.01)
*F16D 67/02* (2006.01)

(52) U.S. Cl. ............... 428/120; 192/12 R; 188/251 R; 523/156; 260/998.13

(58) Field of Classification Search ............... 428/120, 428/64.1; 132/12 R; 188/251 R; 523/156; 260/998.13
See application file for complete search history.

(56) References Cited

U.S. PATENT DOCUMENTS

| | | | |
|---|---|---|---|
| 3,967,037 A | 6/1976 | Marzocchi et al. | 428/392 |
| 4,700,823 A | 10/1987 | Winckler | 192/107 |
| 4,784,893 A * | 11/1988 | Nishimoto et al. | 428/209 |
| 4,844,218 A | 7/1989 | Genise | 192/53 |
| 5,004,497 A * | 4/1991 | Shibata et al. | 75/229 |
| 5,156,787 A * | 10/1992 | Booher | 164/135 |
| 5,498,462 A * | 3/1996 | Darfler | 428/116 |
| 5,646,076 A | 7/1997 | Bortz | 442/136 |
| 5,858,511 A | 1/1999 | Lisowsky | 428/167 |
| 5,871,159 A | 2/1999 | Carlson et al. | 241/4 |
| 5,989,375 A | 11/1999 | Bortz | 156/148 |
| 5,998,311 A | 12/1999 | Nels | 442/203 |
| 6,001,440 A * | 12/1999 | Miyamoto et al. | 428/36.9 |
| 6,087,022 A | 7/2000 | Burris et al. | 428/610 |
| 6,098,612 A * | 8/2000 | Nakamoto et al. | 126/204 |

FOREIGN PATENT DOCUMENTS

| | | |
|---|---|---|
| EP | 0 687 829 A1 | 6/1995 |
| GB | 1374710 | 11/1974 |

* cited by examiner

*Primary Examiner*—Elena Tsoy
(74) *Attorney, Agent, or Firm*—Daniel S. Kalka (57) ABSTRACT

A functionally graded friction material 18 having improved wear resistance and thermal conductivity with fibers 10 and heat conducting elements 12 disposed in an arrangement that conducts heat away from a first surface 20 to a second surface 22. Preferably, the heat conducting elements 12 are copper, copper alloy, filaments, threads, or wire situated substantially perpendicular to the engaging surface and extending to the non-engaging surface 22.

17 Claims, 7 Drawing Sheets

FUNCTIONALLY GRADED FRICTION MATERIAL

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates generally to functionally graded friction material, and more particularly to a functionally graded friction material containing a fiber reinforced composite with heat conducting elements therein that offers better wear resistance due to frictional and thermal conductivity properties. The improved friction material is particularly suited for use as a facing material in clutch or brake applications.

2. Description of the Related Art

Friction material is currently used in many industrial applications, for example, in vehicle clutches, brakes, synchronizers in transmissions, clutch packs in limited slip or locking differentials, industrial or marine couplings, as well as in a variety of other applications. Desirable characteristics of a good friction material include low costs, high wear resistance, high heat resistance, high coefficiency of friction as well as consistence of coefficiency of friction over a wide heat and load range, and time periods. In a friction device, there is typically at least two cooperating members with at least one of the cooperating members being a support member and having a friction material surface that is constructed to be moved into and out of engagement with the opposing surface on the other cooperating member. Some applications of these devices are usually referred to by their particular purpose, for example, a dry brake or clutch which as used herein is intended to mean a brake or a clutch wherein the friction surfaces are dry. In contrast, a wet brake or clutch is intended to mean a brake or clutch wherein the friction surfaces are lubricated, or are cooled by direct or indirect contact with a liquid. The friction material of the present invention is applicable to either application.

Commercially available friction materials include pyrolytic-carbon fabric material as disclosed in U.S. Pat. Nos. 4,700,823; 4,844,218; and 5,858,511 which are all assigned to the Assignee of the present invention, and hereby incorporated by reference. Fiber reinforced polymer composites are commercially available and may be manufactured in a variety of ways including those described in U.S. Pat. No. 5,646,076.

Still, there exists a need for an improved friction material and methods for making the same. The improved friction material should offer better wear resistance and longer useful life by exhibiting improved frictional and thermal conductivity properties.

BRIEF SUMMARY OF THE INVENTION

Accordingly, an object of the present invention is to provide a friction material with improved wear resistance and thermal conductivity.

Another object of the present invention is to provide a functionally graded friction material suitable for use in industrial and vehicle applications.

Still another object of the present invention is to provide a functionally graded friction material consisting of a fiber reinforced polymer composite with heat conducting elements therein.

Still, a further object of the present invention is to provide a method for making a functionally graded friction material offering better wear resistance due to frictional and thermal conductivity properties.

The above and other objects are accomplished with a friction material having improved wear resistance and thermal conductivity. The friction material according to the present invention comprises a functionally graded material consisting of a composite material having heat and wear resistant fibers therein impregnated with a resin, and a plurality of heat conducting elements situated within said functionally graded material in an orientation wherein said heat conducting elements transfer heat away from one surface of said functionally graded material to another surface.

The present invention is also directed to an improved friction material which includes heat conducting elements disposed in a selected arrangement for transferring heat away from an engaging surface of the friction material.

The present invention is further directed to a method for making a functionally graded friction material which includes the step of positioning a plurality of heat conducting elements in an arrangement and having a varying concentration, the heat conducting elements being constructed to transfer heat away from a surface that is constructed to engage a movable part to an opposite surface for heat dissipation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

DETAILED DESCRIPTION OF THE INVENTION

A functionally graded material as that term is used herein means a composite material with a microstructure tailored in terms of spatial distribution and concentration of different material phases or elements. Typically in a particulate and/or fiber reinforced metal matrix composite, the reinforcement material is distributed uniformly. The concept of a functionally graded material provides further opportunity to control component response by grading the material composition appropriately. In functionally graded materials, the objective of a microstructure gradation is to vary material properties spatially as necessary for the functioning of a component, or to reduce undesirable features such as internal residual stresses. The property gradient in the material is caused by a position-dependent chemical composition, microstructure or atomic order. Examples of several designs of functionally graded material are shown in FIGS. 1–7. The various designs shown have the ability to use the concept of concentration change in many applications.

Figure 1A:
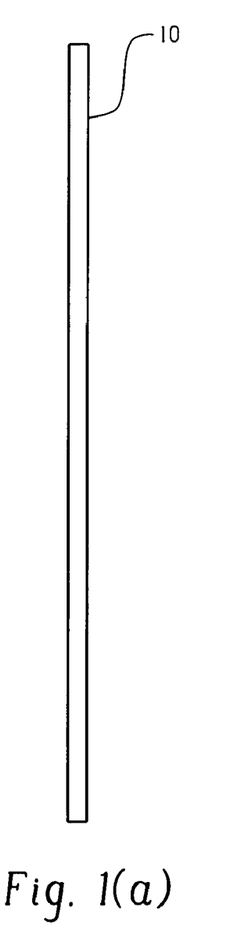
FIG. 1(a)–(c) are illustrations of a Kevlar fiber, a heat conducting element, and a roped strand.
Figure 1B:
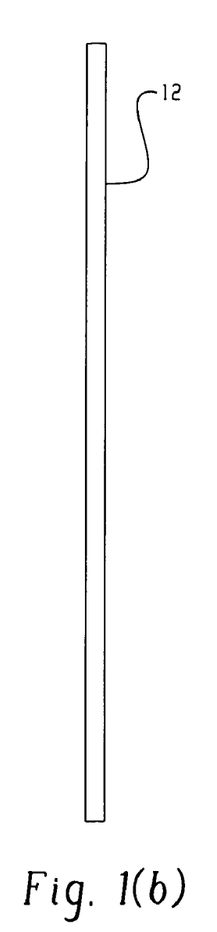
Figure 1C:
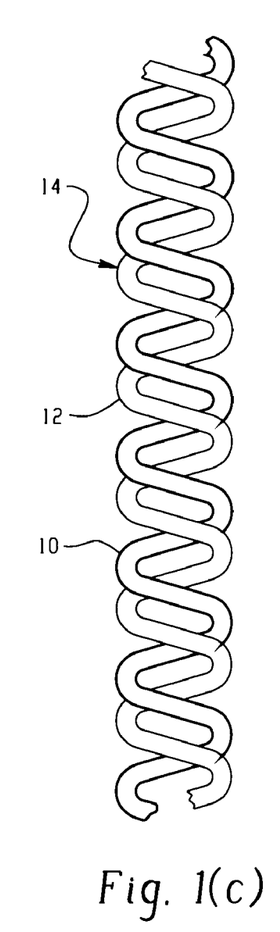

FIGS. 1(a)–(b) depict a fiber 10, such as a Kevlar fiber (Kevlar is a registered trademark of E.I. Du Pont de Nemours and Company), and a heat conducting element 12, such as a copper or copper alloy thread or filament, roped together to form a strand 14. Of course, strand 14 may comprise a plurality of such fibers roped or braided together. While fiber 10 is shown as being a Kevlar fiber, it should be understood that this example is being provided for illustrative purposes only and is not intended to be limited thereto.

Figure 2:
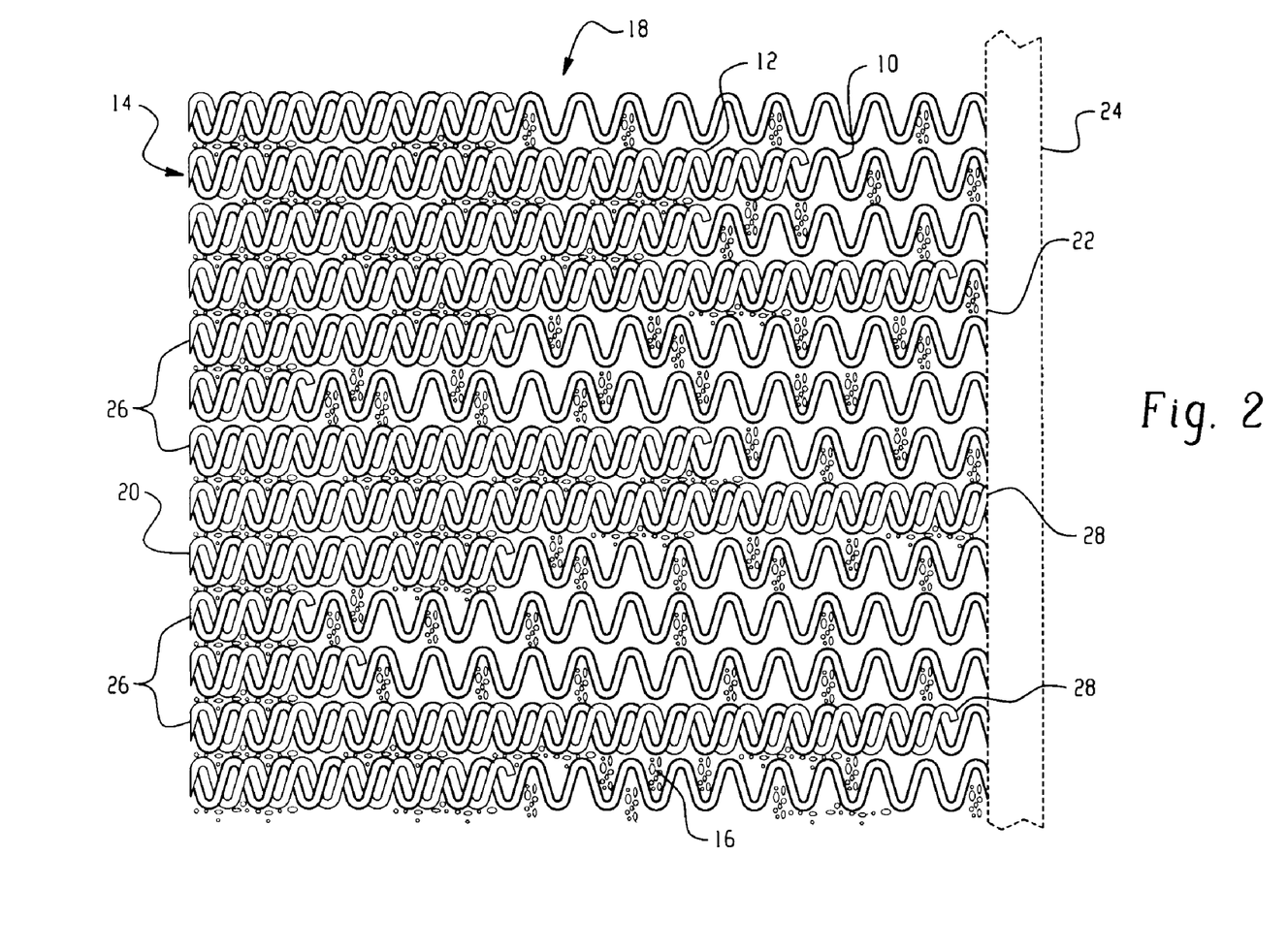
FIG. 2 is a sectional schematic of a functionally graded friction material according to a first embodiment of the present invention.

FIG. 2 is a sectional view of a functionally graded friction material made with a plurality of fibers 10 and heat conducting elements 12 impregnated with a high temperature resin 16, like a phenolic resin, to form the composite 18. Composite 18 has first surface 20, also referred to as a friction surface or an engaging surface, and a second surface 22, also referred to as a non-engaging surface. The second surface 22 is typically joined to a support structure 24 (shown in dashed lines) like a metal backing plate by way of an adhesive, rivets or other fasteners, etc. The composite 18 is formed from a plurality of strands 14 that are needle punched (also referred to as needling) into the mass of fibers 10. A base material like a felt material may be used, or the fibers 10 may have a sufficiently high density that eliminates any necessity of a base material.

Figure 3A:
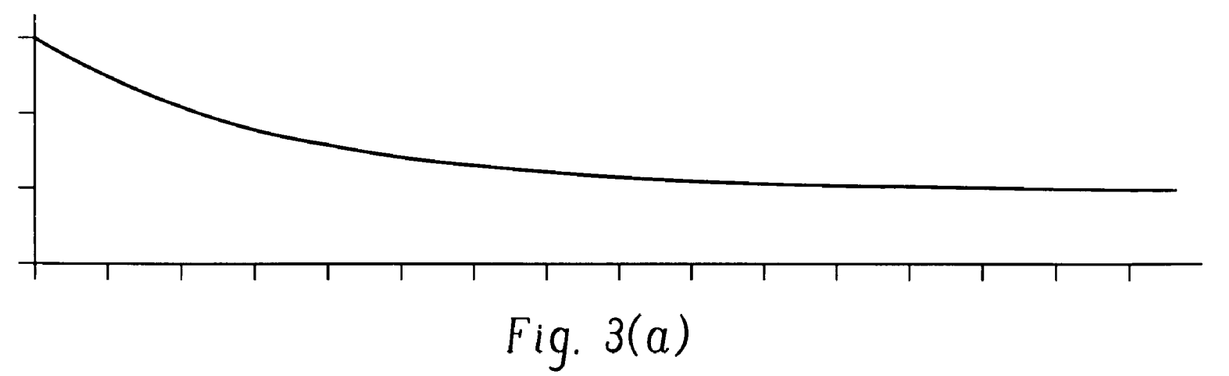
FIG. 3(a)–(b) are graphs illustrating the concentration of the heat conducting element and the Kevlar fiber through the cross section of material of FIG. 2.

FIG. 3(a) shows how the concentration of the heat conducting elements 12 decrease through the material from the friction surface 20 to the second surface 22 in a controlled manner.

Figure 3B:
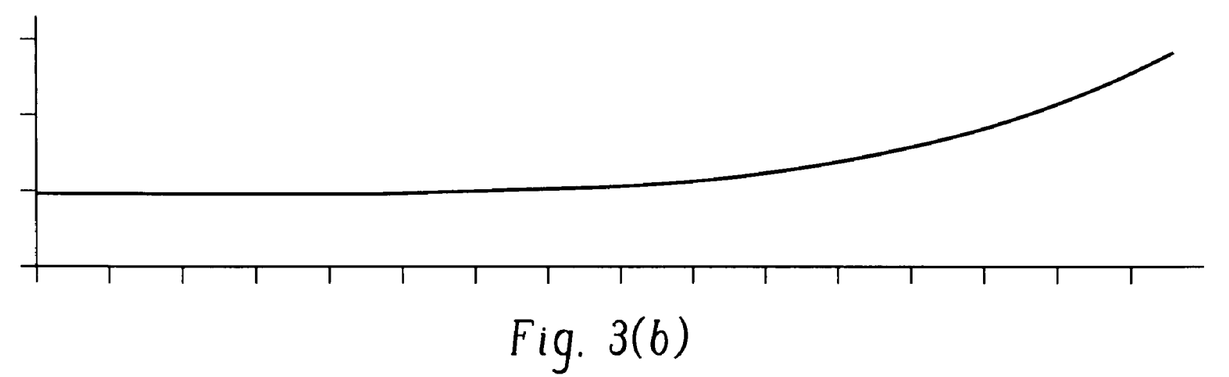

FIG. 3(b) shows a constant Kevlar fiber concentration throughout the material. Similarly, a crystal structure or a distribution pattern may be designed.

The gradient may be one-, two-, or three-dimensional and preferably does not contain discontinuities. The present invention allows for a number of possibilities to classify gradient materials including, but not limited to:

(1) the material classes they combine, e.g., metal ceramic, polymer-ceramic, metal—metal, etc.;

(2) the relative gradient extension, that is, to what extent the gradient is distributed across a component such as functionally graded coatings, functionally graded bulk materials, etc.;

(3) the geometry, and/or symmetry of the gradation for example, one-, two-, three-dimensional, radial, cylindrical, axial, etc.;

(4) their function in a component: in interface graded materials, the gradient serves to join two materials with no particular profile of a functional property, in a field-adapted graded material, the gradation introduces a well defined profile of a functional property that allows an optimum response of the component to an external field; and (5) the way the gradient acts to achieve a desired response, to modify a field applied to the component (e.g., reduce a driving force like energy release rate), or to modify an internal response of the material (e.g., locally increase the fracture toughness).

In the preparation of a functionally graded friction material, an important objective is to achieve a well controlled-to-the-design distribution of composition, texture, structure, and any other necessary elements. Preferably, the preparation method can accommodate a number of compositional distribution functions.

A functionally graded friction material can be produced by traditional powder processing routes, if an additional gradation step is introduced before consolidation, for example, as employed in powder processing with solid phase methods. One problem associated with powder processing is the consolidation of the graded compact. Sintering rates differ with position, and uneven shrinkage may lead to warping or cracking.

Another powder processing route includes the dry processing-powder stacking technique. This technique is used to prepare powder compacts by stacking dry powders. The basic technique consists of premixing powders of an appropriate composition and simply stacking one layer on top of the other. Dry stacking techniques typically produce discrete layers.

Conventional powder processing is frequently modified by employing powder suspensions instead of the powders themselves. This technique is the wet processing-slurry technique. Aqueous suspensions of powders are sprayed, for example, by separate guns, and drying takes place during the spraying process. This allows for a very fine adjustment of the gradient since very thin layers may be stacked. Smoothly graded powder compacts can be prepared by filtration. For this purpose, the composition of a slurry in a mixing tank is continuously varied, liquid for filtration is then taken from the tank.

Still another traditional technique is the consolidation technique-sintering method. Some of the main drawbacks of powder technology in functionally graded material production, apart from processing costs, are the difficulties in consolidating the powder mixtures. A pre-densification step such as cold rolling is often carried out, followed by densification at elevated temperatures. One prerequisite for the successful consolidation of the densely graded powder compact is equality between the packing density of the different powder mixtures. Otherwise, uneven shrinkage will lead to deformation of the compact during sintering. A similarity of the sintering kinetics of the different compositions is also required at all temperatures, otherwise the compact will warp and crack during the sintering process. For functionally graded components having a simple geometry, deformation during densification can be reduced by hot pressing in a die. However, the dies may lack chemical compatibility with many materials.

There are other methods, such as vapor phase methods, for making functionally graded materials. One such technique is the thermal spray technique. Thermal spray techniques are very attractive methods for the production of a functionally graded material coating as they are suitable for metals and refractory materials. Thermal spray techniques can be used for the production of functionally graded material coatings as well as for bulk functionally graded materials. If plasma spraying is used for a functionally graded material production, spraying parameters such as gun-substrate distance, carrier gas composition, and plasma current usually differ substantially for the different phase. Nevertheless, it has been possible to produce functionally graded coatings using a single torch by varying these parameters during spraying. Proper design of the gun is required to facilitate mixing of the powders.

Still another vapor phase method is the chemical vapor deposition (CVD) method. The CVD method yields a material deposit with source gases as the feedstock. The deposit is caused by the application of various forms of energy (heat, light, plasma, etc.) onto the source gases after they are introduced into a reactor. Hydride, bromide, and chloride are generally used for source material. When the source material is in a liquid or solid form, it is vaporized. By continuously changing the mixture ratio of the source gases or by controlling the CVD conditions, such as deposition temperatures or gas pressures, the CVD method permits relatively easy synthesis of various types of functionally graded friction materials.

Still another vapor phase method applicable to the present invention is a chemical vapor infiltration method (CVI). The chemical vapor infiltration process, which evolved from the chemical vapor deposition for surface coatings, uses porous materials such as ceramic bodies and ceramic cloths which contain many residual pores. These materials are first placed inside a CVD furnace as a substrate. By decomposition or by chemical reaction of the source gases, a coating is deposited on the surface of the open-pore or the space inside of the porous substrate.

Physical vapor deposition (PVD) is a vapor phase technique where a solid source material is energized using different kinds of an energy source to obtain vaporized particles which deposit on a substrate to form a film. This technique may be employed to accomplish a planned chemical reaction of the vaporized particles in a gas phase. Since the deposition speed of the PVD method is rather slow, only a thin film can be produced using this method. However, since this technique does not require high temperature heating of the substrate, it is preferred for the preparation of the thin functionally graded material films used, for example, in electronics.

Another vapor phase technique is a surface chemical reaction method. In this type of method, the source gases are forced to react on the surface or in the voids of a porous matrix, resulting in the chemical reaction products. The concentration of the end product continuously changes from the surface towards the inside by diffusion. This concentration gradient is controllable by regulating the reaction temperature.

In addition to the above methods, there is a liquid phase method such as an electro-deposition technique. The electro-deposition technique is suitable for the production of thin-sheet, gradient metallic alloys. The composition or structure in the direction substantially normal to the deposition surface can be continuously changed by either controlling the concentration of the metallic ions in the electrolytic solution or by controlling the electric current.

There also exist some non-conventional techniques like extrusion free form fabrication. Unique extrusion free form fabrication systems are capable of rapid prototyping, monolithic polymer, metal and ceramic parts, and entail the sequential deposition of layers of self supporting viscous suspensions or highly loaded thermoplastics using a computer controlled extrusion head. In particular, the extrusion head builds up a three dimensional body by sweeping out a path based on computer aided drafting (CAD) virtual image. For the fabrication of functionally graded friction materials, the systems are modified to use two extruders for dispensing dissimilar materials into a small mixing head. The composition of the bi-component extrudate is controlled by proportioning the raw material feed rate from the two extruders. In this manner, the composition can be graded to produce a functionally graded friction material component. This approach allows for grading between any thermodynamically compatible ceramic-metal, ceramic—ceramic, or metal—metal material combination. The main advantages of this technique over other functionally graded friction material fabrication processes are that it has the ability to control the composition of the body in both the horizontal and vertical directions, the ability to prepare complex shapes directly, and that the process is amenable to a large variety of material systems.

The present invention resides in a functionally graded friction material having improved wear resistance and thermal conductivity fabricated using any of the previously described processes. The friction material in accordance with the present invention comprises a functionally graded material consisting of a composite material having heat and wear resistant fibers therein impregnated with a resin and a plurality of heat conducting elements situated within the composite material in an orientation wherein the heat conducting elements conduct heat from one surface of the friction material to another surface which preferably is positioned adjacent some form of a heat sink, including, but not limited to, a metal backing or support plate.

The term "heat conducting element" as used herein is meant to include, but not be limited to: a thread, a filament or a fiber whose aspect ratio (length to effective diameter) is for all practical purposes infinity, i.e., a continuous fiber, a wire, or a thread, or even a powder or particulate arranged in heat conducting passages or channels. The heat conducting element may be a metal or an alloy, or even a nonmetal. The term fiber as used herein is meant to include relatively short lengths of very small cross sections which may be chopped filaments. The term "strand" is a bundle of continuous filaments combined or roped in a single compact unit. The term "yarn" is an assemblage of twisted fibers or strands to form a continuous yarn or spun yarn suitable for use in weaving.

Referring back to FIG. 2, there is depicted a functionally graded friction material or composite 18 comprising a mat or substrate which consists of woven aramid fibers, preferably those of the poly (p-phenyleneterephthalamide) type, like Kevlar fibers 10 (Kevlar is a trademark of E.I. Du Pont de Nemours and Company). The aramid fibers 10 are woven with heat conducting elements 12 which in this example are preferably copper threads that have roped together with the Kevlar fibers 10, and then impregnated with a resin 16. Preferably, the resin comprises a phenolic resin that resists heat and retains mechanical properties at high temperatures, greater than approximately 200° C. Suitable heat resistant resins include, but are not limited to, phenolics, polyethersulfone, polyarylsulfone, polysulfone, polyphenylsulfone, polyimide, poly-(amide-imide), polyphenylene sulfide, polyphenylquinoxaline, polybutadiene copolymers (some), and fluorosilicones. Other suitable, but less heat resistant polymer resins include, but are not limited to, epoxies, polybutylene terephthalates and the like.

The friction material according to the present invention positions the heat conducting elements 12 in contact with a first or friction surface 20 of the friction material composite 18 that is subjected to friction. The heat conducting elements 12 transfer heat away from the first surface 20 to a second or non-engaging surface 22, and then to a metal backing plate 24 (shown in dashed line) which functions as a heat sink. Preferably, the heat conducting elements 12 are copper or copper alloy thread or wire inserted through, roped, or woven with aramid fibers 10 which are then impregnated with resin to form the composite 18 during the thickening stage.

FIGS. 2 and 3(a)–(b) show the density of the copper threads 12 being much greater on the first surface 20, than the density of the copper threads 12 on the second surface 22. At the first surface 20, the total concentration of Kevlar fibers and heat conducting elements 12 combined ranges from about 55% to about 85% on a weight percent basis. The concentration of the Kevlar fibers to the heat conducting elements 12 preferably is about 50:50 (a 1:1 ratio). In other words, about 22.5% to about 42.5% on a weight percent basis is the concentration for each of the Kevlar fiber 10 concentration and the heat conducting elements 12 concentration. At the second surface 22, there is about 20% to about 30% on a weight percent basis of the original concentration from the first surface 20. In other words, there is about 11.0% to about 30% on a weight percent basis heat conducting elements 12 at the second surface 22. The Kevlar fiber 10 concentration at the second surface 22 is about 45% to about 55% on a weight percent basis. The higher density of copper threads 12 extends to a set depth or thickness of the composite 18. The concentration of Kevlar fibers 10 gradually increases throughout the material as the concentration of the heat conducting elements 12 decrease as best seen in FIG. 3(b). The decrease in concentration of the heat conducting elements 12 occurs over a depth or thickness of about 0.05 inches to about 0.10 inches, preferably about 0.09 inches, which is approximately one half the thickness of the friction material starting from the first surface 20 in this example. Of course, the gradient change may occur throughout the entire thickness of the material as well, and that thickness can vary depending upon the specific application.

In this manner, the improved functionally graded friction material according to the present invention conducts heat generated by friction away from the source. By transferring the heat generated due to friction from the engaging surface, the present invention provides a friction material having improved wear resistance and thermal conductivity.

In FIG. 2, the friction material 18 may include a base material made from felt material or the like with the fibers 10 and copper thread 12 interwoven or placed thereon, or needle punched therethrough. Alternatively, the fibers 10 may be densely packed or pressed, and then the copper threads or wires 12 inserted therein by needling followed by impregnation with a resin to form the composite 18. Alternatively, strands 14 of roped Kevlar fibers 10 and copper filaments 12 may be densely packed, pressed, or needled together. The metal threads, preferably copper or copper alloy, can also be laid through the thickener (or thickening phase) in an orientation which places a plurality of ends 26 in contact with the friction surface 20 and the opposite ends 28 in contact with or near the opposing surface 22 for transferring heat generated by friction.

The heat conductive elements 12 may run along the surface or are preferably in a direction substantially normal or fairly perpendicular to the friction surface 20. More preferably, the heat conducting elements 12 are arranged in a predetermined pattern or have a symmetrical orientation.

It should be immediately apparent that any heat conducting element 12 is suited for the present invention, including, but not limited to, copper, copper alloy, metal, metal alloy, graphite, etc. Also, the heat conducting element may be provided in powder or particulate form so as to provide thermal conducting means in the form of channels or paths from one surface 20 to the other 22.

While p-aramid or meta-aramid fibers such as Kevlar or Nomex fibers, Kevlar and Nomex are registered trademarks of E.I. Du Pont de Nemours and Company, are particularly suited for the present invention, other suitable fibers include, but are not limited to fibers of minerals, glass, polyester, asbestos, cotton, tetrafluoroethylene or polytetraflouroethylene (PTFE), graphite, carbon, pyrolytic carbon, or any synthesized friction or polymer fibers, for example, poly (p-phenylene-2,6,-benzobisoxazole) fibers, also referred to as PBO fibers or ZYLON fibers, ZYLON is a trademark of Toyobo Co. Ltd. Similarly, the fibers 10 may be short, chopped fibers having lengths of 1 to 3 centimeters (cm) or less, packed, pressed, or even molded together.

Figure 4A:
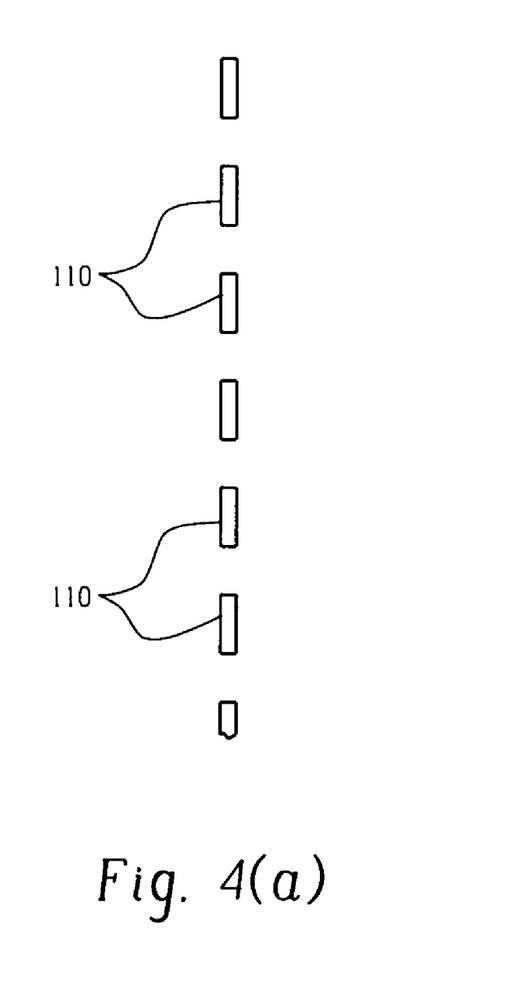
FIG. 4(a)–(b) are illustrations of a chopped Kevlar fiber and a heat conducting element.
Figure 4B:
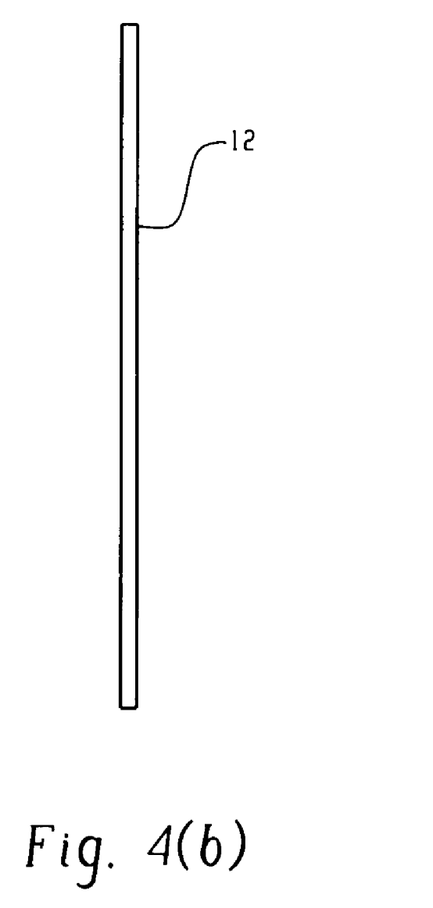
Figure 5:
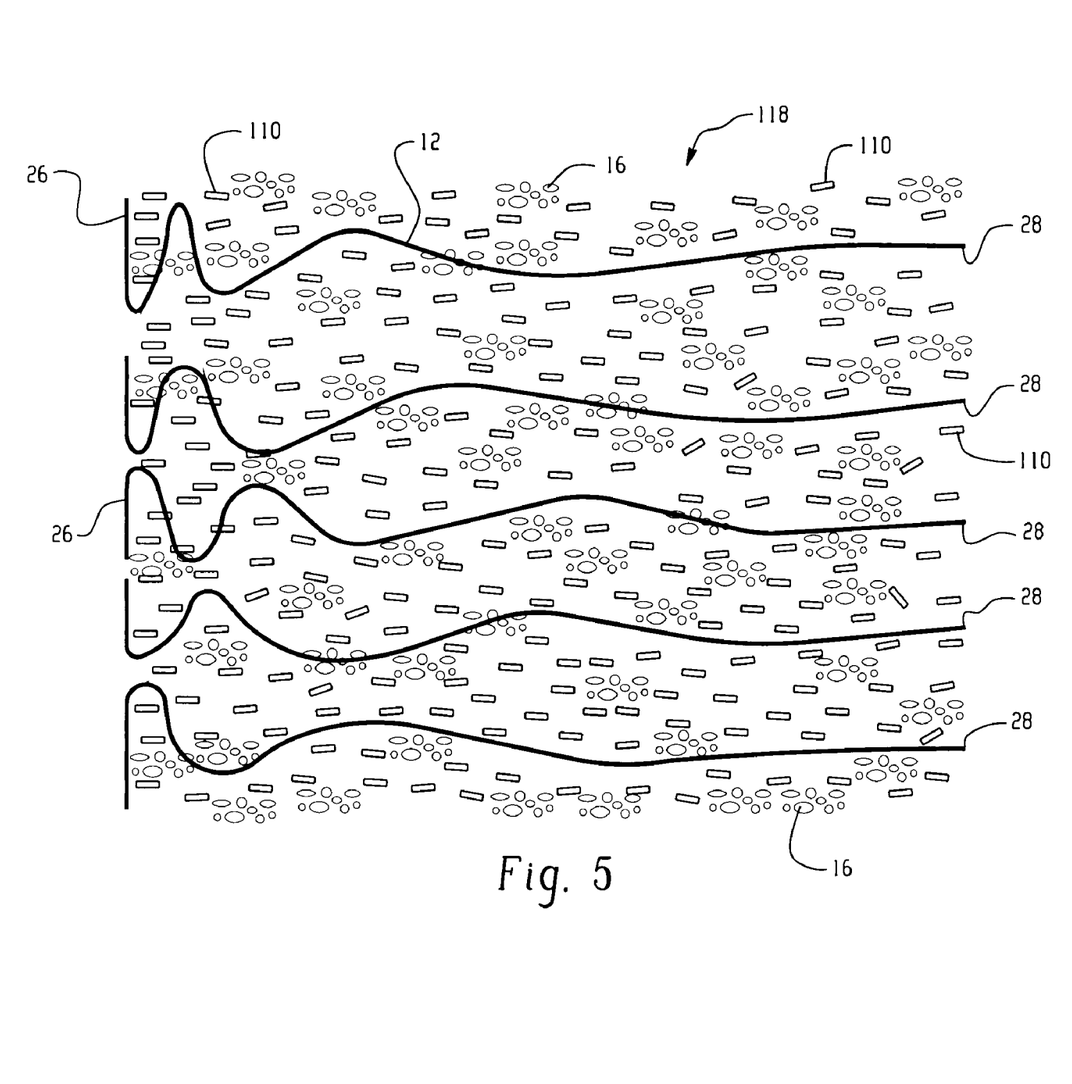
FIG. 5 is a view similar to the view of FIG. 2 showing another embodiment according to the present invention where continuous heat conducting elements are placed in chopped, dry laid Kevlar fibers.

FIGS. 4(a) and (b) depict short, chopped fibers 110 with a heat conducting filament 12. FIG. 5 is a sectional view schematically depicting a composite 118 made with continuous copper filaments 12 placed in chopped, dry laid Kevlar fibers 110. This material is impregnated with a high temperature resin 16 and cured to form composite 118. The concentration curves of the copper filaments 12 and the chopped, Kevlar fibers 110 are similar to those shown in FIGS. 3(a) and (b).

Figure 6:
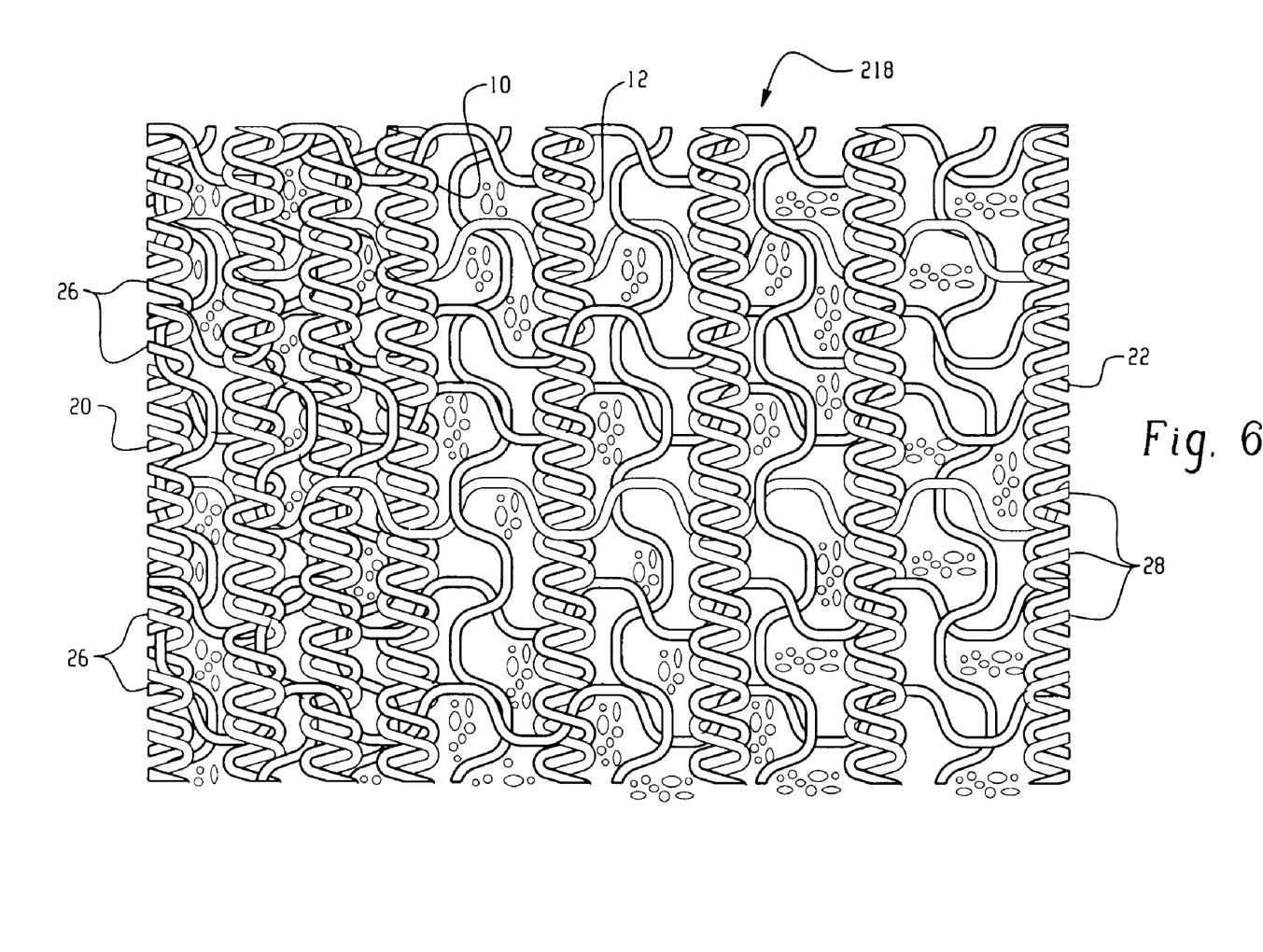
FIG. 6 is a view similar to FIG. 2 showing still another embodiment in accordance with the present invention where the Kevlar fibers and heat conducting elements are "roped" together, and woven.

In another embodiment shown in FIG. 6, the composite 218 is constructed of Kevlar fibers 10 and heat conducting elements 12 that have been roped together, woven, and impregnated with a resin. Again, the concentration curves of the Kevlar fibers 10 and the heat conducting elements 12 are similar to those of FIGS. 3(a) and (b).

Figure 7:
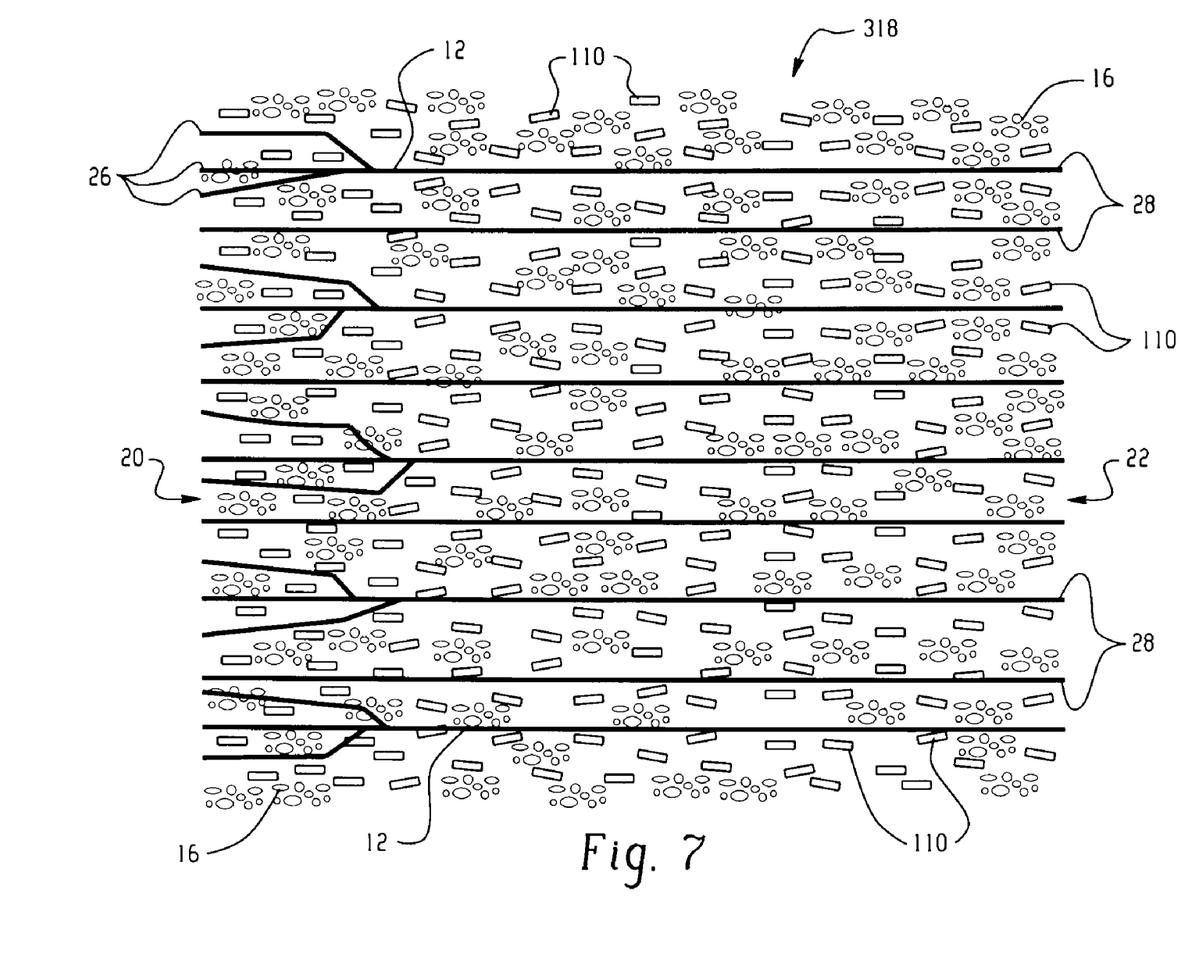
FIG. 7 is a view similar to FIG. 5 showing yet another embodiment of the present invention.

FIG. 7 shows still another embodiment of the present invention. Composite 318 is made from chopped, Kevlar fibers 110 with heat conducting elements 12 placed therein, and impregnated with a resin. As before, the concentration curves of the chopped, Kevlar fibers 110 and heat conducting elements 12 are similar to FIGS. 3(a) and (b).

The spacing between the heat conducting elements 12, particularly with reference to FIGS. 5 and 7, can range from about 0.030 inches to about 0.050 inches on the first surface 20. Then, the spacing between the heat conducting elements 12 increases to about 0.050 inches to about 0.10 inches at the second surface 22.

It should be understood that the concentration gradients and the spacing between heat conducting elements may be adjusted as desired depending upon the applications and materials involved.

The functionally graded friction material in accordance with the present invention may be fabricated by a variety of known methods for making friction products, for example those described in U.S. Pat. No. 5,646,076. These methods include resin saturation of wetlaid fibers and/or particles; weaving or knitting of fibers with subsequent resin impregnation; flowable molding, bulk molding, and/or calendaring compression techniques; and spiral or helical winding or wrapping of continuous length fibers, woven cloth or felt, or tapes with subsequent resin impregnation; and even a dry laid, nonwoven and carded, batt, mat or web fibrous form.

EXAMPLES I

The fiber concentration may range from about 30% (weight percent) to about 80% (weight percent). Preferably, the fiber concentration ranges from about 50 to about 70% (weight percent). The preferred fibers include p-aramid fibers like Kevlar fibers. Poly (p-phenylene-2,6,-benzobisoxazole) fibers, also referred to as PBO fibers, may also be employed in the friction material of the present invention. ZYLON, a registered trademark of Toyobo Co., Ltd. is a preferred source for PBO fibers.

Preferably, the fibers have a fiber diameter of about 10 to about 15 microns (μ) and a length of about 0.1 to about 8 cm. The fibers are about 1 to about 7 denier. The orientation of the fibers can range from about 0° to about 90° to the friction surface 20. The fibers may be either dry laid or wet laid to build up a thickness, preferably of about 1.5 to about 2.5 cm. The heat conducting elements, such as graphite or metal fibers, filaments, or wires, like preferably copper or copper alloy filaments with a diameter ranging from about 10 to 15 microns, are added in a concentration that preferably ranges from about 2 to about 3% (weight percent). Preferably, the heat conducting elements are inserted by roping the Kevlar fibers and the heat conducting elements together and using conventional needle punch equipment. The roped fibers are situated at an orientation that can range from about 0° to about 90° from the friction surface 20. The preferred orientation for the heat conducting elements is at about 45° to the friction surface 20. The substrate made of the fibers 10 and copper filaments 12 is then impregnated with a phenolic resin and compressed to a thickness of preferably about 0.5 cm., and cured at a temperature below about 300° F.

EXAMPLE II

In this example shown in FIG. 5, the heat conducting elements 12 are placed in chopped, dry laid Kevlar fibers 110 and impregnated with a high temperature resin and cured to form the composite 118.

EXAMPLE III

As shown in FIG. 6, the Kevlar fibers 10 and heat conducting elements 12 are roped together, woven, and then impregnated with a resin and cured to form the composite 318.

EXAMPLE IV

This example shown in FIG. 7 is similar to Example II except that the heat conducting elements 12 are more linear and wire-like with branches at the friction surface side.

While specific embodiments of the invention have been shown and described in detail to illustrate the application of the principles of the invention, it will be understood that the invention may be embodied otherwise without departing from such principles.

I claim:

1. A clutch facing material with improved wear resistance and thermal conductivity, comprising:
   a functionally graded material including a composite material having heat and wear resistant fibers therein impregnated with a resin; and
   a plurality of heat conducting elements situated within said functionally graded material in a selected orientation and spatial distribution with a varying concentration, wherein said functionally graded material is constructed for engagement with a cooperating movable member, said functionally graded material including a first friction surface constructed for such engagement and a second non-engaging surface, said varying concentration of said heat conducting elements decreasing in concentration from said first friction surface to said second non-engaging surface, said heat conducting elements transferring heat away from the first friction surface of said functionally graded material to the second non-engaging surface.

2. A clutch facing material as set forth in claim 1, wherein said plurality of heat conducting elements comprise members selected from the group consisting of filaments, threads, wires, powders, and particulate, said heat conducting elements being disposed in said functionally graded material in a predetermined arrangement.

3. A clutch facing material as set forth in claim 1, wherein said plurality of heat conducting elements are positioned substantially normal to said first friction surface of said functionally graded material.

4. A clutch facing material as set forth in claim 1, wherein said heat and wear resistant fibers comprise aramid fibers.

5. A friction material as set forth in claim 4, wherein said aramid fibers comprise p-aramid fibers.

6. A clutch facing material as set forth in claim 2, wherein said plurality of heat conducting elements comprise members selected from the group consisting of metal, metal alloy, copper, copper alloy, and graphite compositions.

7. A clutch facing material as set forth in claim 1, wherein said fibers comprise members selected from the group consisting of minerals, glass, asbestos, cotton, polyester, graphite, carbon, pyrolytic carbon, aramid, synthetic, and polymer fibers.

8. A clutch facing material as set forth in claim 1, wherein said heat conducting elements comprise a greater density on said first friction surface than said second non-engaging surface.

9. In a composite clutch facing material having opposed surfaces with one surface engaging a movable, engageable part, the improvement comprising heat conducting elements disposed in said composite clutch facing material in a selected arrangement and a varying concentration for transferring heat away from said engaging surface to a non-engaging surface, said varying concentration of said heat conducting elements decreasing in concentration from said first surface to said second non-engaging surface.

10. The clutch facing material according to claim 9, wherein said heat conducting elements comprise a plurality of metal components disposed within said friction material.

11. The clutch facing material according to claim 10, wherein said plurality of metal components comprise members selected from the group consisting of filaments, threads, and wires.

12. The clutch facing material according to claim 11, wherein said plurality of metal components comprise members selected from the group consisting of copper components and copper alloy components.

13. The clutch facing material according to claim 10, wherein said metal components are oriented substantially perpendicular to said engaging surface.

14. The clutch facing material according to claim 9, wherein said heat conducting elements comprise a greater density on said engaging surface than on said non-engaging surface.

15. A clutch facing material as set forth in claim 8, wherein the density of said heat conducting elements on said first friction surface ranges between about 22.5% to about 42.5% on a weight percent basis.

16. A clutch facing material as set forth in claim 4, wherein said heat conducting elements comprise copper threads, said copper threads being woven with said aramid fibers.

17. A clutch facing material as set forth in claim 8, wherein the varying concentration of said plurality of heat conducting elements comprises a decrease in concentration of said plurality of heat conducting elements over a depth of about 0.05 inches to about 0.10 inches.

* * * * *